Nov. 27, 1928.　　　　　　　　　　　　　　　　1,693,146
G. T. KEELER
LIQUID HOLDER
Filed Nov. 23, 1927
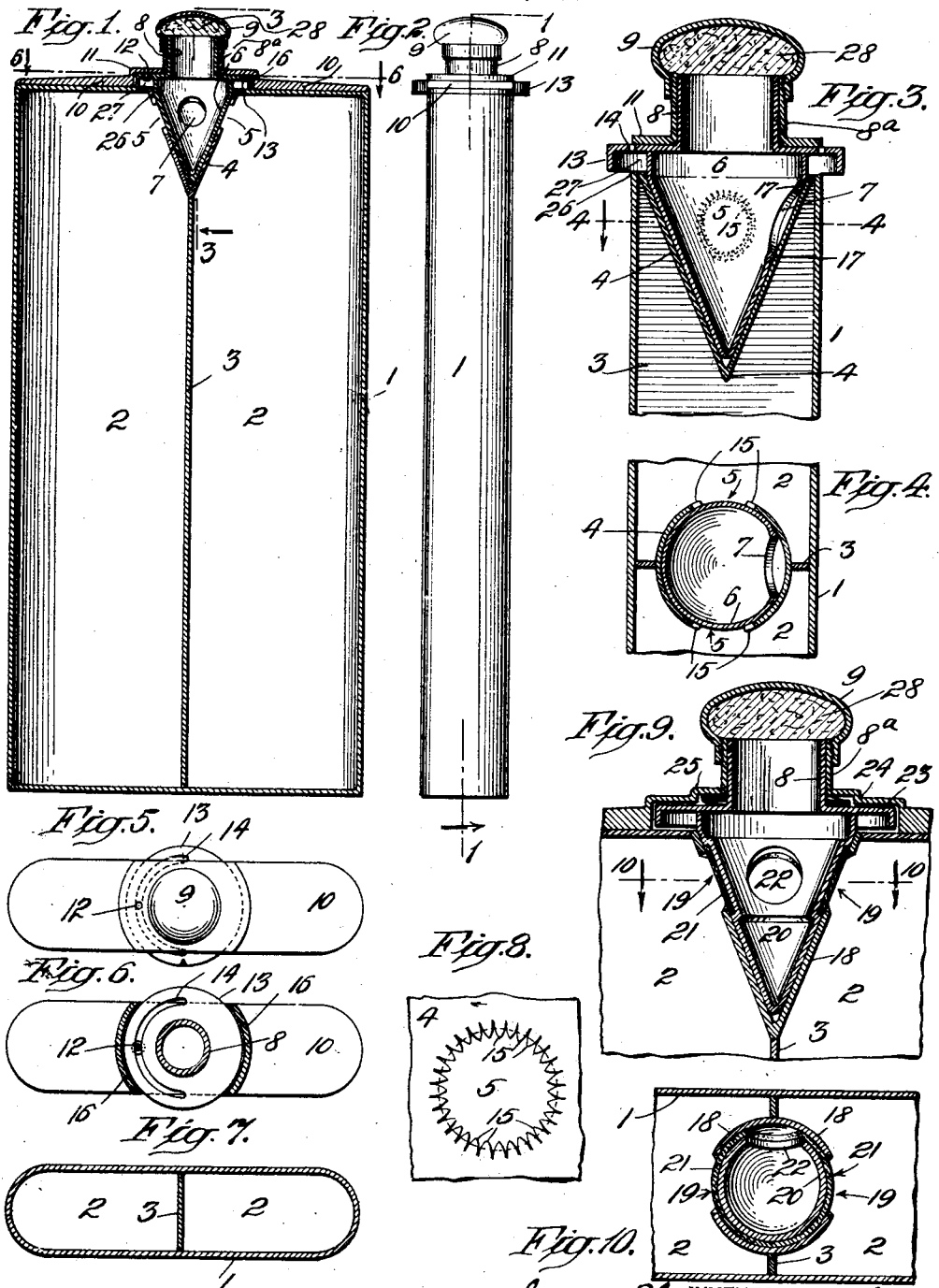
INVENTOR
George Thompson Keeler
BY Fred E. Tasker
ATTORNEY Patented Nov. 27, 1928.

1,693,146

UNITED STATES PATENT OFFICE.

GEORGE THOMPSON KEELER, OF NEW YORK, N. Y.

LIQUID HOLDER.

Application filed November 23, 1927. Serial No. 235,219.

The present invention relates to certain new and useful improvements in liquid holding receptacles usually of the portable class, which are essentially so constructed that the receptacle subserves all the purposes of several bottles or holders that are ordinarily required to hold several kinds of liquid. My object is to provide a device arranged to contain several different liquids, contained separately from each other, each of which, being thus separate from the others, may be drawn off at will in any desired order.

To accomplish this object the invention consists primarily in a chamber or subdivided holder, bottle, flask or the like, in combination with outlet means consisting of a cup or measuring glass that will hold a predetermined quantity and which is mechanically held within the holder and is adjustable with reference to the compartments or chambers in the holder, the said cup being provided with a single suitable opening adapted to register with a similar opening in each compartment, said openings being so disposed with reference to each other and to the motion of the cup in opening and closing the compartments and the arrangement of the latter that communication may be had with one subdivision or another while the other subdivisions are held securely closed, and there being thus provided by way of the openings an outlet for withdrawing a measured or regulable quantity of either liquid from its respective subdivision, and thus enabling the cup to take out this quantity, said cup constituting moreover a movable cap or closing piece for the plural liquid holder.

Other objects are to prevent leaking, and to afford an economical and simple device, easy and cheap to manufacture; and provide a plural chambered liquid container with means for filling and emptying each compartment thereof without interference with any other of the associated sections.

And to state the same in other words a further object of my invention is to provide a multi-chambered holder for various liquids of varying constituents provided with an outlet valve device consisting of a rotary cup through which the liquids pass to be discharged, which valve device among other uses serves as a measuring or gauging means for ascertaining the quantity of liquid passing into or drawn from either or all of the compartments thereof, or for measuring out a predetermined quantity withdrawn for use.

And the invention also comprises various details and peculiarities in the construction, combination and arrangement of parts, substantially as will be hereinafter described and claimed, following the explanation of the construction and operation of a preferred embodiment, in the description of which other objects and purposes besides those already mentioned will appear.

In the annexed drawing illustrating my invention:

Figure 1 is a vertical section of my improved liquid holder, taken on the line 1, 1, of Figure 2.

Figure 2 is an edge elevation of the same.

Figure 3 is an enlarged detail sectional view of the valved discharge cup, taken on the line 3, 3, of Figure 1.

Figure 4 is a detail horizontal section on the line 4, 4, of Figure 3.

Figure 5 is a top plan view.

Figure 6 is a horizontal sectional top plan view on the line 6, 6, of Figure 1.

Figure 7 is a horizontal cross section showing the different compartments.

Figure 8 is a detail view of a portion of the side wall of the discharge valve means, indicating the serrated periphery of the outlet orifice therein to stop leakage.

Figure 9 is an enlarged detail section, similar to Figure 3 and showing a modification of the means to prevent leakage.

Figure 10 is a horizontal cross section of the same on the line 10, 10 of Figure 9.

Similar characters of reference denote like parts in all the different figures of the drawing.

1 denotes a bottle, flask or holder, formed of glass, metal or any other desirable material and having any size, shape, configuration, dimensions and purpose. It has a bottle neck 8ª. The preferred embodiment shown is oblong or flat in cross-section, and has a single partition 3 to divide it into two subdivisions or chambers 2, 2; but I have selected this as only one of many forms, for the bottle may be any shape and have any number of chambers.

The top of the holder has a central opening, preferably circular, at 26, into which is fitted the large upper circular end of a hollow cone or tapered piece 4, which is stationary and whose bottom apex or pointed end is secured to the partition 3, so that it forms a part of said partition or division wall between the chambers 2. The stationary conical member 4 has therein two opposite circular openings 5, 5, one for each chamber 2, these orifices 4 being for filling or emptying the chambers separately as either is actively in use. Obviously when the number of chambers increases, the number of orifices 5 will increase, so that there may be one for each chamber.

To the top of the casing 1 is welded or otherwise suitably secured a head or top plate 10, see Figure 1. This may vary in thickness, but the middle portion is struck up to raise a part 11 on edges 16 sufficiently above the top of the holder and sufficiently above the central opening 26 where the cone 4 is joined that there may be a recess 27 below part 11 large enough to contain a rotary disk member 13 whose edges project through opposite slots in the wall at the sides of recess 27, beyond the edges of the holder 1, as shown in Figures 3, 5, and 6, to enable the disk 13 to be grasped by the hand for manual rotation, to effect the proper adjustment of the rotary valve cone and cup member 6. The disk 13 is formed integral with conical cup 6. The raised part 11 carries the integral bottle neck 8ª in which is tube 8. Said cup 6 is seated closely within the stationary inner orificed cone 4, and is rotated therein by disk 13, in order to bring the single orifice 7 with which rotary cone 6 is provided into coincidence with the outlet orifice 5 in one or the other of compartments 2.

The recess 27 below raised section 11 is of a proper size to loosely contain the disk 13 and allow it to be revoluble, and to this end I can make the top piece 10 of any variable or other thickness and recessed or bent as preferred to furnish said space 27; and the raised section 11 is centrally orificed at the point where I provide the integral discharge spout 8ª in which is telescopically contained the spout or tube 8 which is integral with movable cone 6 and disk 13, in order that the contents of the cone cup 6 may be poured out. Said discharge 8 and bottle neck 8ª are provided with a removable screw or other cap 9 lined with cork 28 that closes down tightly over the upper ends of tubes 8 and 8ª as shown. In order to limit the rotary movement of the disk 13 in one direction or the other when rotating it to open access to one or the other of chambers 2, and to close off such access, I attach a stop pin 12 to the top piece 11, which pin engages and rides in a semicircular slot 14 in the disk 13. The pin strikes against the ends of slot 14 and stops the disk when it has been moved far enough.

It is of course essential that there should be no leakage between the telescoping cones 4 and 6, whatever their position, either when the fluid passages are open to allow the escape of fluid, or when they are closed or in their neutral position. It is desirable therefore that the external surface of the rotary member 6 fit closely against the inner wall of the stationary conical member 4. Many ways may be devised to cause the necessary tight fit at all times between these parts. One kind I show in Figures 3, 4, and 8; and an alternative form I show in Figures 9 and 10.

In the form in Figures 3, 4, and 8, the periphery of each circular outlet orifice 5 in the stationary conical member 4 is fringed with a series of inwardly projecting teeth or fingers 15 which are flexible so that they will bend under a slight pressure. Or to express it otherwise the inner periphery of opening 5 is serrated or toothed by cutting out the pointed sections 15 which will bend under small pressure. And the movable rotary cone 6 is furnished with an outer rib 17 encircling its single orifice 7. This outer rib 17 binds tightly against the inner wall of cone 4 and when said rib 17 is in any position of adjustment of cone 6 except directly against the teeth 15, said rib 17 will slightly bend the edge of the opening 7 so tightly against cone 4 that the wall of cone 6 immediately around the rib 17 is flexed away slightly from contact with cone 4, as shown in Figures 3 and 4. But when the rotary cup or plug 6 is rotated so as to place its rib-encircled opening 7 directly opposite to the toothed edge of opening 5, the rib 17 will spring out against the more yielding teeth 15 and bend the same in towards the interior of chamber 2, and this will cause the flexed away part of wall of cone 6 to resume its circular form and press very tightly against the wall of cone 4, for the bending of fingers 15 takes care of rib 17. In this way a very tight joint is made when opening 7 coincides with the opening 5.

The other example of leak-preventing means is shown in Figures 9 and 10. The construction is quite similar in many respects to that in the other views. Thus we have the stationary cone 18, and the rotating cone 20. Cone 18 has orifices 19 and cone 20 has an orifice 22. Cone 20 carries integral disk 23, rotatable in recess under cover 24, and provided with discharge spout 8 having cap 9, said spout 8 being in neck 8ª. Between the cover member 24 and the disk 23 is interposed a spring 25 which urges the disk 23 and conical cup 20 downwardly so that cone 20 will seat very tightly in the stationary cone 18 and assist in preventing leakage. Also the inner cone 20 is provided with an annular encircling groove opposite the orifices 19, which groove receives a cork or similar packing strip 21 which is let into the groove flush with the surface of inner cone 20, and thus a very tight and non-leak joint between the contacting surfaces of the inner and outer cones, especially at the points where the opening 22 coincides with either of the openings 19. The material of the packing 21 may be either cork or rubber or any other suitable substance.

In the other form having the peripheral series of teeth 15 around orifice 5 and a rib 17 around orifice 7, the periphery of orifice 7 may be provided with a series of teeth instead of a circular rib; each tooth may have a lug thereon adapted to bear against one of the teeth 15, and the result will be the same as when the rib is used. The effect of a full circular rib is the same as that of a circular series of small segments of the rib, one on each tooth.

The operation and use of my improved liquid holder will be evident from the foregoing. If the different chambers are filled with liquids of different constituents or properties it is possible to carry small quantities in a package of limited size and to draw out either kind for use at will at any time. If the outlet valve device consists of two interrelated conical members, one stationary and the other revolving snugly therein, the inner one may have a predetermined capacity that will enable it to serve as a measuring cup, so that when it is turned to open the orifices into any compartment, and the position of the flask or holder is reversed the conical measuring device will be filled with the exact quantity desired, after which the conical device may be rotated again to shut off the supply flowing thereinto. Now if the screw or other cap is removed the measured quantity of the particular liquid desired may be poured out for use. This process may be repeated with each contained liquid as long as there is any in the holder.

It may be noted that while I have shown herewith and described herein a particular form of device I do not limit myself to the exact details of construction shown and described, as the same may be varied in many particulars without deviating from the intent and scope of my invention.

What I claim, is:

1. In a liquid holder, a multi-chambered casing having an outlet neck, in combination with a stationary inner cone having an orifice communicating with each chamber, and a rotary cone within the first cone and having a single orifice that coincides with either of the orifices in the stationary cone, said rotary cone having a disk projecting outwardly so as to be manually engaged for adjustment, and having an outlet within the outlet neck.

2. In a liquid holder, a multi-chambered casing, in combination with a stationary inner cone having an opening into each chamber, and a rotary cone within the first cone and having a single orifice that coincides with the opening into either chamber, said rotary cone having a projecting disk for manually rotating, and having also a discharge spout, means on the casing to provide a recess for the disk and allow it to project externally so as to be handled, and means for closing the discharge spout.

3. In a device of the class described, the combination with a casing having a plurality of partitioned chambers, of a stationary perforated cone forming part of the partition between the chambers and secured in an opening in one end of the casing, a rotary orificed cone in the stationary cone having a disk for manually rotating it and having a projecting spout, a plate secured on the end of the casing and forming a recess between it and the case to receive said disk, said plate having an opening opposite the conical means, and means for making a tight closure at said opening.

4. In a device of the class described, the combination with a casing having a plurality of chambers, of a stationary orificed cone forming part of the partition between the chambers and secured in an opening in one end of the casing, the orifices in the cone having serrated edges composed of a plurality of divided flexible fingers, a rotary cone revolubly arranged in the stationary cone and having a single orifice adapted to register with the openings in the stationary cone and provided with a rib thereon adapted to engage with the series of fingers to make a tight joint, means for manually rotating said cone, and means for opening and closing the outlet end thereof.

5. In a device of the class described, a casing having several chambers divided by partitions, a pair of telescoping conical cups, one stationary forming part of the partition and having an opening into each chamber, the other rotatable and having a single opening adapted to register with the opening adapted to register with the openings in the stationary cone, said rotary cone having a disk for rotating it and a discharge spout, and being of a predetermined capacity, and means for closing and opening the discharge spout.

In testimony whereof I hereunto affix my signature.

GEORGE THOMPSON KEELER.